United States Patent Office 3,828,050
Patented Aug. 6, 1974

3,828,050
3-ALKOXY-14-ACYLOXYDIHYDROMORPHINONE DERIVATIVES
William Roger Buckett, Lanark, Scotland, and Hans Harold Bosman, Epe, Netherlands, assignors to Akzona Incorporated, Asheville, N.C.
No Drawing. Continuation-in-part of abandoned application Ser. No. 35,881, May 8, 1970. This application Aug. 7, 1972, Ser. No. 278,240
Claims priority, application Great Britain, May 16, 1969, 25,025/69
Int. Cl. C07d 43/28
U.S. Cl. 260—285    4 Claims

ABSTRACT OF THE DISCLOSURE

The invention relates to novel 3-alkoxy, 14-valeryloxy or caproyloxy-dihydronormorphinone derivatives, which at the nitrogen atom are substituted with a cyclopropylmethyl or cyclobutylmethyl radical, and their acid addition salts; these compounds show very useful properties in that they exert a surprisingly improved analgesic activity besides tranquillizing, cough suppressing and anticonvulsant properties, without inducing depressing respiration.

CROSS-REFERENCE TO RELATED APPLICATION

This application is a continuation-in-part of application Ser. No. 35,881, filed May 8, 1970, now abandoned.
The invention relates to novel morphinone derivatives and more particularly to certain esters of 14-hydroxy-dihydronormorphinone derivatives.

BACKGROUND OF THE INVENTION

Chemically the morphinone derivatives belong to the morphine and morphine-like substances. Morphine which is a strong analgesic has a disadvantage of readily inducing harmful morphine addiction. Nalorphine, an N-allyl derivative of morphine is known to have reasonable analgesic properties and to be a good morphine antagonist, but it has the undesirable side effect of inducing hallucinogenic phenomena. Generally the biological activities of the morphine-like substances are widely different.
An important improvement in the field of analgesic substances was the finding of N-substituted-14-hydroxy-dihydronormorphinone derivatives reported in the Belgium Pat. 691,715. Said Belgium patent describes 14-hydroxy-dihydronormorphinone derivatives, substituted at the nitrogen atom with a dimethylallyl, cyclopropylmethyl- or cyclobutylmethyl radical. These derivatives show analgesic properties without remarkably inducing the known side effects accompanying the use of morphine.

SUMMARY OF THE INVENTION

Surprisingly we have found that certain esters of 3-alkoxy-14-hydroxy-N-substituted - dihydronormorphinone exert a strongly improved analgesic activity, both in oral as well as parenteral administration, in comparison with the corresponding non-esterified compound.

The novel esters according to the invention have the general formula:

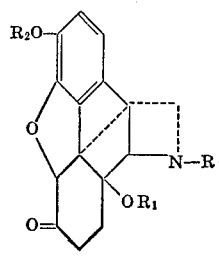

in which

R is a cyclopropylmethyl or cyclobutylmethyl group,
$R_1$ is a valeryl or caproyl moiety, and
$R_2$ is a lower alkyl group with 1–6 carbon atoms, as well as the acid addition salts thereof.

The novel esters show very useful analgesic properties. They are extremely valuable in post-operative treatment of patients, because of their analgesic, psychosedative, cough suppressing, anticonvulsant and lack of respiratory depressent properties.

The novel esters according to this invention can be prepared by esterification of 3-alkoxy-N-substituted-14-hydroxy-dihydronormorphinone with valeric or caproic acid or a functional derivative of these acids, such as the acid chloride, acid bromide or the anhydride.

3-Alkoxy-N-substituted - 14 - hydroxy - dihydronormorphinone can be obtained in various ways. For example 14-hydroxy-dihydrocodeinone can be acylated in the 14-position, e.g. with acetic acid anhydride, in the resulting product the N-methyl group is then replaced by an N-cyano group by reaction with bromocyan whereupon the cyano group is removed with a strong acid e.g. sulphuric acid, thus yielding 14-hydroxy-dihydronorcodeinone. This latter compound is a suitable starting material to obtain the relative N - substituted - 14 - hydroxy - dihydronorcodeinones by means of reaction with cyclopropylmethylbromide or cyclobutylmethylbromide. An alternative method comprises conversion of 14-hydroxy-dihydronorcodeinone with glycol into the corresponding ethyleneketal which is converted in turn by reaction with cyclopropylcarbochloride or cyclobutylcarbochloride into the corresponding N-cyclopropylcarboxyl or N-cyclobutylcarboxyl compound which by subsequent reduction with lithium aluminium hydride followed by splitting off of the ethyleneketal group by boiling with acid yields the corresponding N-cyclopropylmethyl- or N-cyclobutylmethyl-14-hydroxy-dihydronorcodeinone.

Also the acid addition salts of the compounds with the general formula indicated belong to the present invention. Generally they are even preferred due to the better physical properties.

With acid addition salts are meant the salts derived from therapeutically acceptable organic or inorganic acids such as HCl, HBr, phosphoric acid, maleinic acid, fumaric acid, succinic acid, citric acid, acetic acid, glutamic acid or aspartic acid.

The following pharmacological data demonstrate the superiority of the esters according to the invention in comparison with 14-hydroxy - N-substituted-dihydronorcodeinone and other esters thereof.

Analgetic properties

A. Writhing test: Intraperitonial injection of phenyl-p-benzoquinone in mice elicits a characteristic writhing syndrome. Premedication by oral administration or subcutaneous injection with drugs abolishes or reduces the syndrome. The method consists of comparing the number of writhing movements in drug treated animals with the mean of control groups. The figures demonstrate the $ED_{50}$ values, this means the dose of drugs to produce 50% reduction of the writhing movements within a given time.

| Substance | Writhing test Subcutaneous $ED_{50}$ in mg./kg. body weight | Oral $ED_{50}$ in mg./kg. body weight |
| --- | --- | --- |
| References, 14-hydroxy compounds: | | |
| 14-hydroxy-N-cyclopropylmethyl-dihydronorcodeinone | 31.5 | >100 |
| 14-hydroxy-N-dimethylallyl-dihydronorcodeinone | 12.5 | (¹) |
| 14-hydroxy-N-cyclobutylmethyl-dihydronorcodeinone | 2.7 | (¹) |
| 14-hydroxy-N-allyl-dihydronorcodeinone | 7.8 | >100 |
| References, esters: | | |
| 14-acetoxy-N-cyclopropylmethyl-dihydronorcodeinone·HCl | 4.3 | 1-10 |
| 14-butyryloxy-N-cyclopropylmethyl-dihydronorcodeinone | 3.4 | 48.8 |
| 14-oenanthyloxy-N-cyclopropylmethyl-dihydronorcodeinone | 1.2 | 23.5 |
| 14-oenanthyloxy-N-dimethylallyl-dihydronorcodeinone | 24 | 60.7 |
| 14-caproyloxy-N-allyl-dihydronorcodeinone·HCl | 4.4 | 10 |
| Esters according to the invention: | | |
| 14-valeryloxy-N-cyclopropylmethyl-dihydronorcodeinone | 0.25 | 5.19 |
| 14-caproyloxy-N-cyclopropylmethyl-dihydronorcodeinone | 0.32 | 5.25 |
| 14-valeryloxy-N-cyclobutylmethyl-dihydronocodeinone | 0.5 | 5.8 |

¹ Inactive.

From the table it appears that the activity in the writhing test of the esters according to the invention are remarkably improved in comparison with other esters and the corresponding 14-hydroxy compounds.

B. Hot plate test: To control the data obtained in the writhing test the esters according to the invention have further been tested in the hot plate test, a well known test for analgesic activity. The hot plate test is described in the article by N. B. Eddy and D. Leimbach, J. Pharm. exp. Ther. *107*, pp. 385–393 (1953).

Substance: $ED_{50}$ s.c. in mg./kg.
14-hydroxy - N - cyclopropylmethyl-dihydronorcodeinone  >100
14-caproyloxy - N-cyclopropylmethyl-dihydronorcodeinone  12 (7–22)
14-valeryloxy - N-cyclopropylmethyl-dihydronorcodeinone  8.5 (2.9–18)

C. Acute toxicity: The acute toxicity of the compounds was determined in albino male mice using subcutaneous, intravenous and oral routes of administration. Groups of ten mice were used and observed for effects at 24 hours and 5 days. The 50% lethal dose ($LD_{50}$ value) is based on the latter time interval.

| Substance | $LD_{50}$ value in mg./kg. body weight | | |
| --- | --- | --- | --- |
| | Intravenous | Subcutaneous | Oral |
| 14-hydroxy-N-allyl-dihydronorcodeinone | 105 | >300 | >300 |
| 14-hydroxy-N-dimethylallyl-dihydronorcodeinone | 89 | >300 | >300 |
| 14-hydroxy-N-cyclopropylmethyl-dihydronorcodeinone | 67 | >300 | >300 |
| 14-propionyloxy-N-allyl-dihydronorcodeinone·HCl | 192 | >300 | >300 |
| 14-caproyloxy-N-allyl-dihydronorcodeinone·HCl | 258 | >300 | >300 |
| 14-caproyloxy-N-dimethylallyl-dihydronorcodeinone | 465 | >300 | >300 |
| 14-propionyloxy-N-dimethylallyl-dihydronorcodeinone | 112 | >300 | >300 |
| 14-propionyloxy-N-cyclopropylmethyl-dihydronorcodeinone | 92 | >300 | >300 |
| 14-acetoxy-N-cyclopropylmethyl-dihydronorcodeinone·HCl | 105 | >300 | >300 |
| 14-caproyloxy-N-cyclopropylmethyl-dihydronorcodeinone | 165 | >300 | >300 |
| 14-valeryloxy-N-cyclopropylmethyl-dihydronorcodeinone | 132 | >300 | >300 |

From the above table it appears that the acute toxicity of all compounds is of the same order.

The esters according to the invention can be administered orally or parenterally, preferably in doses of 20–50 mg. per day. For oral administration the compounds can be compressed into tablets, preferably mixed with excipients, or they can be administered in the form of a powder in capsules. For injection purposes the compounds are brought into solutions, suspensions or emulsions.

The following examples illustrate the method for the preparation of esters of 14 hydroxy-N-substituted-dihydronorcodeinone.

EXAMPLE I 6.4 g. of N-dimethylallyl-14-hydroxy-dihydronorcodeinone were dissolved in 30 ml. of benzene. 14 ml. of acetic acid anhydride were added to the solution whereupon the mixture was refluxed for 1½ hours. The benzene was distilled off and the residue was poured into water. The pH of the mixture was adjusted to 9 with a sodium carbonate solution and was subsequently extracted with benzene (four times).

The combined benzene extracts were concentrated to dry and the residue was dissolved in ethanol. Acidification of the ethanolic solution with concentrated hydrochloric acid yields 5.3 g. of N-dimethylallyl-14-acetoxy-dihydronorcodeinone-HCl (melting point 145.0–146.5° C.).

EXAMPLE II

In a similar manner were prepared:

N-cyclopropylmethyl-14-acetoxy-dihydronorcodeinone·HCl; melting point: 250–251.5° C.,
N-allyl-14-acetoxy-dihydronorcodeinone·HCl; melting point: 258–258.5° C., and
N-cyclobutylmethyl-14-acetoxy-dihydronorcodeinone; melting point: 188.5–190° C.

EXAMPLE III 4.1 g. of N-dimethylallyl-14-hydroxy-dihydronorcodeinone were dissolved in 30 ml. of benzene. 5.9 g. of propionic acid anhydride were added and the mixture was boiled with reflux for 20 hours. The benzene was distilled off and the residue was poured into water. The pH of the mixture was adjusted to 9 with a sodium carbonate solution and then extracted with benzene (4 times).

The combined benzene extracts were concentrated. The residue was crystallized from an acetone-water mixture (ratio 4:1) yielding 3.2 g. of N-dimethylallyl-14-propionyloxy-dihydronorcodeinone (melting point 131.4–132.2° C.).

EXAMPLE IV 30 g. of N-cyclopropylmethyl-14-hydroxy-dihydronorcodeinone were dissolved in 50 ml. of toluene. 20 g. of butyric acid anhydride were added to the solution and the mixture was boiled with reflux for 11 hours. The toluene was distilled off and the residue was poured into water. The mixture was adjusted to pH 9 with a sodium carbonate solution and then extracted with benzene (5 times) The combined benzene extracts were concentrated to dry. Crystallization of the residue from an acetone-water (4:1) mixture yielded 18 g. of crude ester. Recrystallisation from the same solvent (fresh) yielded N-cyclopropylmethyl-14-butyryloxy-dihydronorcodeinone (m.p. 84.2–85.4° C.).

EXAMPLE V 25 g. of N-dimethylallyl-14-hydroxy-dihydronorcodeinone were dissolved in 250 ml. of benzene. 31 g. of butyric acid anhydride were added and the mixture was boiled with reflux for 41 hours. The benzene was distilled off and the residue was poured into water. The pH of the mixture was adjusted to 9 with a sodium carbonate solution and extracted with benzene (4 times).

The combined benzene extracts were concentrated to dry and the residue was dissolved in 150 ml. of 3 N acetic acid. The acetic acid solution was adjusted to pH 2 with sulphuric acid and was then extracted with ether. On neutralization of the aqueous phase with a sodium carbonate solution 24 g. of a brownish yellow precipitate were obtained which, on recrystallisation from an acetone-water (4:1) mixture, yielded 17 g. of N-dimethylallyl-14-butyryloxydihydronorcodeinone (m.p. 82.0–83.5° C.).

EXAMPLE VI 30 g. of N-cyclopropylmethyl-14-hydroxy-dihydronorcodeinone were converted into N-cyclopropylmethyl-14-valeryloxy-dihydronorcodeinone in the same way as described in Example V but using valeric acid anhydride instead of butyric acid anhydride yielding 19 g. with melting point 95.5–96.5° C. Similarly N-dimethylallyl-14-hydroxy-dihydronorcodeinone yielded N-dimethylallyl-14-valeryloxy-dihydronorcodeinone with melting point 102.4–103.6° C., and N-cyclobutylmethyl-14-hydroxy-dihydronorcodeinone yielded N-cyclobutylmethyl-14-valeryloxy-dihydronorcodeinone with melting point 102–103° C.

EXAMPLE VII 59 g. of N-dimethylallyl-14-hydroxy-dihydronorcodeinone were reacted with 51 g. of caproic acid anhydride in the same way as described in Example III, except that the residue of the benzene extracts was dissolved in ethanol. To this ethanolic solution ether was added until turbidity just occurred. On standing in a refrigerator 33 g. of N-dimethylallyl-14-caproyloxy-dihydronorcodeinone were obtained as crystals (m.p. 85.4–86.5° C.).

In the same way N-cyclopropylmethyl-14-caproyloxy-dihydronorcodeinone (m.p. 102–104° C.) and N-cyclobutylmethyl-14-caproyloxydihydronorcodeinone (m.p. 108–109° C.) were obtained.

EXAMPLE VIII 49 g. of N cyclopropylmethyl-14-hydroxy-dihydronorcodeinone were added to 140 ml. heptanoic acid anhydride. The solution was heated to 110° C. with stirring and kept at said temperature for 2 hours. The mixture was cooled, poured into water, whereupon the pH was adjusted to 9 with a solution of sodium carbonate. The mixture was then extracted with benzene (4 times). The combined benzene extracts were concentrated to dryness. The residue was dissolved in ether and subjected to chromatography over neutral $Al_2O_3$. The eluates containing ester were evaporated to dryness. Crytallisation of the residue from petroleum ether yields 47 g. of N-cyclopropylmethyl-14-heptanoyloxydihydronorcodeinone (m.p. 87.4–88.2° C.).

In a similar way but with recrystallization from an ethanol-water (4:1) mixture 32 g. of N-dimethylallyl-14-heptanoyloxy-dihydronorcodeinone (m.p. 66.0–67.2° C.) were obtained from 40 g. of N-dimethylallyl-14-hydroxy-dihydronorcodeinone.

What is claimed is:

1. N-cyclopropylmethyl-14-valeryloxy-dihydronorcodeinone and pharmaceutically acceptable acid addition salts thereof.

2. N-cyclopropylmethyl - 14 - caproyloxy-dihydronorcodeinone and pharmaceutically acceptable-acid addition salts thereof.

3. N-cyclobutylmethyl - 14 - valeryloxy-dihydronorcodeinone and pharmaceutically acceptable acid addition salts thereof.

4. N-cyclobutylmethyl - 14 - caproyloxy-dihydronorcodeinone and pharmaceutically acceptable acid addition salts thereof.

References Cited

UNITED STATES PATENTS

| | | | |
|---|---|---|---|
| 3,254,088 | 5/1966 | Lewenstein | 260—285 |
| 3,300,500 | 1/1967 | Sawa et al. | 260—285 |
| 3,332,950 | 7/1967 | Blumberg | 260—285 |
| 3,654,280 | 4/1972 | Sawa et al. | 260—285 |
| 3,676,557 | 7/1972 | Lochman et al. | 260—285 |

FOREIGN PATENTS

| | | | |
|---|---|---|---|
| 2,022,899 | 11/1970 | Germany | 260—285 |

OTHER REFERENCES

Buckett et al.: Chem. Abstr., Vol. 74, Col. 88183y, abstracting German 2,022,899.

Currie et al.: Chem. Abstr., Vol. 62, Col. 2801n, abstracting British 975,602.

Seki et al.: Yakugaku Zasshi, Vol. 84, pp. 280–5 (1964).

Seki et al.: Yakukahu Zasshi, Vol. 84, pp. 255–257 (1964).

DONALD G. DAUS, Primary Examiner

U.S. Cl. X.R.

424—260